United States Patent
Liao et al.

(10) Patent No.: US 9,872,028 B2
(45) Date of Patent: Jan. 16, 2018

(54) WIRELESS DISPLAY ADAPTATIONS AND OPTIMIZATIONS BASED ON UNFILTERED AND REGIONAL FEEDBACK

(71) Applicant: Intel Corporation, Santa Clara, CA (US)

(72) Inventors: Yiting Liao, Hillsboro, OR (US); Vallabhajosyula S. Somayazulu, Portland, OR (US); Paul S. Diefenbaugh, Portland, OR (US); Krishnan Rajamani, San Diego, CA (US); Kristoffer D. Fleming, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 14/751,992

(22) Filed: Jun. 26, 2015

(65) Prior Publication Data

US 2016/0381368 A1    Dec. 29, 2016

(51) Int. Cl.
*H04N 19/164* (2014.01)
*H04N 19/146* (2014.01)
*H04N 19/112* (2014.01)
*H04N 19/16* (2014.01)

(52) U.S. Cl.
CPC ......... *H04N 19/164* (2014.11); *H04N 19/112* (2014.11); *H04N 19/146* (2014.11); *H04N 19/16* (2014.11)

(58) Field of Classification Search
CPC .......................... H04N 19/164; H04N 19/103
See application file for complete search history.

(56) References Cited

U.S. PATENT DOCUMENTS

| | | | | |
|---|---|---|---|---|
| 7,647,614 B2* | 1/2010 | Krikorian | ......... | H04L 29/06027 725/110 |
| 8,099,755 B2* | 1/2012 | Bajpai | .............. | H04N 21/23406 725/110 |
| 8,706,910 B2* | 4/2014 | Taylor | ................... | H04L 67/303 709/246 |
| 9,106,887 B1* | 8/2015 | Owen | ................... | H04N 19/102 |
| 9,210,444 B2* | 12/2015 | Isnardi | ................... | H04N 19/80 |
| 9,319,696 B2* | 4/2016 | Wu | ...................... | H04N 19/167 |

(Continued)

FOREIGN PATENT DOCUMENTS

| KR | 1020140133891 A | 11/2014 |
|---|---|---|
| WO | 2013048474 A1 | 4/2013 |
| WO | 2013056031 A1 | 4/2013 |

OTHER PUBLICATIONS

International Search Report and Written Opinion for International Patent Application No. PCT/US2016/034040, dated Sep. 9, 2016, 12 pages.

*Primary Examiner* — Jayanti K Patel
*Assistant Examiner* — Irfan Habib
(74) *Attorney, Agent, or Firm* — Jordan IP Law, LLC (57) ABSTRACT

Systems and methods may provide for receiving unfiltered feedback information from a network interface component of a wireless display pipeline and receiving display region-specific information from a region update component of the wireless display pipeline. Additionally, a coding policy associated with wireless display content may be adjusted based on the unfiltered feedback information and the display region-specific information.

20 Claims, 3 Drawing Sheets

(56) References Cited

U.S. PATENT DOCUMENTS

| | | | |
|---|---|---|---|
| 9,414,065 B2* | 8/2016 | Moriyoshi | H04N 19/85 |
| 9,424,660 B2* | 8/2016 | Wang | G06T 9/00 |
| 9,445,114 B2* | 9/2016 | Ouedraogo | H04N 19/70 |
| 9,516,335 B2* | 12/2016 | Chernyshev | H04N 19/147 |
| 2003/0169813 A1* | 9/2003 | Van Der Schaar | H04N 21/23424 375/240.12 |
| 2004/0177147 A1* | 9/2004 | Joshi | G06F 17/3089 709/227 |
| 2006/0109915 A1* | 5/2006 | Unger | H04N 21/2343 375/240.27 |
| 2008/0279097 A1* | 11/2008 | Campion | H04L 47/10 370/229 |
| 2009/0196343 A1* | 8/2009 | Cho | H04L 1/0009 375/240.02 |
| 2010/0228880 A1* | 9/2010 | Hunt | G06F 17/30905 709/246 |
| 2010/0262712 A1* | 10/2010 | Kim | H04N 21/234327 709/231 |
| 2010/0322302 A1* | 12/2010 | Rodriguez | H04N 21/631 375/240.01 |
| 2011/0047283 A1* | 2/2011 | Labonte | H04L 65/80 709/231 |
| 2011/0142125 A1* | 6/2011 | Tripathi | H04N 19/149 375/240.03 |
| 2011/0228845 A1* | 9/2011 | Banerjee | H04L 1/0002 375/240.07 |
| 2012/0147946 A1 | 6/2012 | Gao et al. | |
| 2013/0195119 A1* | 8/2013 | Huang | H04L 65/4092 370/468 |
| 2013/0195204 A1* | 8/2013 | Reznik | H04N 19/85 375/240.26 |
| 2013/0314386 A1 | 11/2013 | Han et al. | |
| 2015/0326941 A1* | 11/2015 | Gao | H04N 21/43635 725/74 |

* cited by examiner

WIRELESS DISPLAY ADAPTATIONS AND OPTIMIZATIONS BASED ON UNFILTERED AND REGIONAL FEEDBACK

TECHNICAL FIELD

Embodiments generally relate to wireless display pipelines. More particularly, embodiments relate to wireless display adaptations and optimizations based on unfiltered and regional feedback.

BACKGROUND

Wireless displays may be used to present visual content received from mobile devices over a wireless link. The mobile device may encode the content prior to transmission via a network interface controller (NIC), wherein only limited feedback information from the transmission link may be available to the encoder. For example, although the NIC may provide the encoder with filtered information such as the average transmitted bit rate, the encoder may be unable to adapt in a way that prevents end-to-end latencies, poor video quality and relatively high power consumption from occurring. These challenges may be even more severe in the presence of higher resolution displays, mobile devices with limited battery/thermal envelopes, and wide-ranging application scenarios (e.g., full-screen movie playback, interactive gaming, productivity oriented usages, and so forth).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
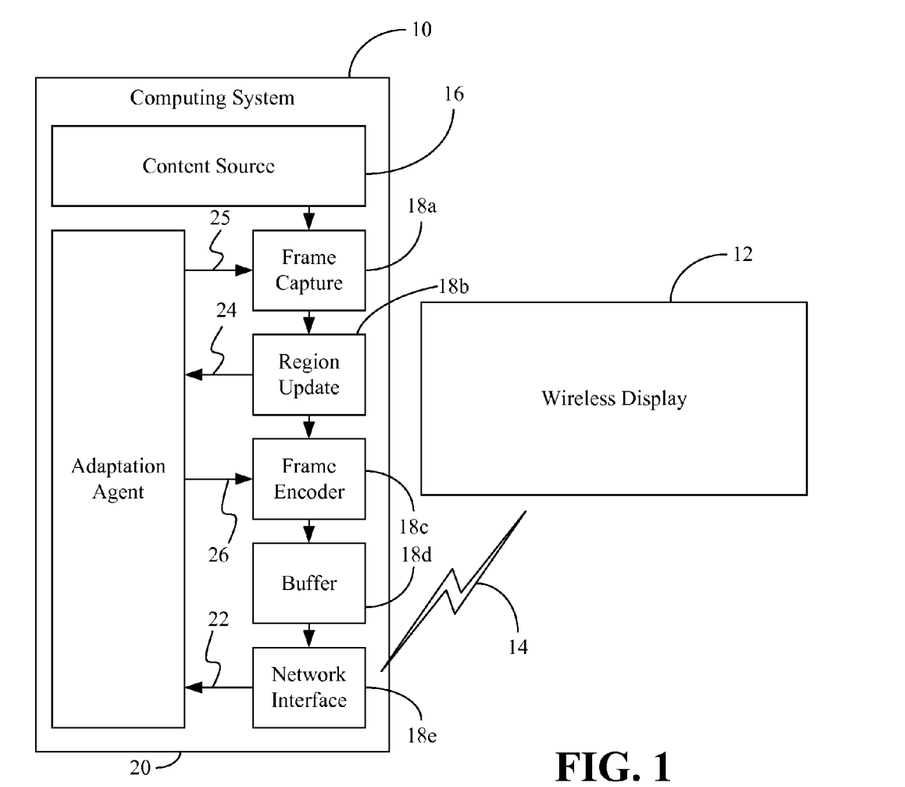
FIG. 1 is a block diagram of an example of a computing system according to an embodiment.

Turning now to FIG. 1, a content delivery computing system 10 is shown, wherein the computing system 10 may generally be used to deliver visual content to a wireless display 12 over a wireless link 14 (e.g., Bluetooth, Wi-Fi). The computing system 10 might include, for example, a desktop computer, notebook computer, tablet computer, smart phone, mobile Internet device (MID), personal digital assistant (PDA), wearable device (e.g., smart clothing, watch, eyewear, headwear, jewelry, etc.), media player, etc., or any combination thereof. The wireless display 12 may include, for example, a liquid crystal display (LCD), light emitting diode (LED) display, etc., or any other display device having wireless communication capability. The visual content may include, for example, movie playback content, interactive gaming content, productivity oriented content, and so forth. In the illustrated example, the visual content is provided by a content source 16 such as, for example, mass storage (e.g., hard disk drive/HDD, solid state disk/SSD, optical drive, flash drive, etc.), a streaming connection, etc., or any combination thereof.

As will be discussed in greater detail, the computing system 10 may also include a wireless display pipeline 18 (18a-18e) having, for example, a frame capture component 18a, a region update component 18b, a frame encoder 18c, a buffer 18d (e.g., output queue), a network interface component 18e (e.g., controller), and so forth. The wireless display pipeline 18 may include other components as well as a different arrangement of components than the arrangement shown. The frame encoder 18c may generally have a coding policy that specifies encoding parameters such as, for example, encoding bit rate, function block configuration parameters, encoding power, etc., associated with the encoding of the visual content to be delivered to the wireless display 12. In the illustrated example, an adaptation agent 20 is closely integrated with the wireless display pipeline 18, and receives unfiltered feedback information 22 from the network interface component 18e and display region-specific information 24 from the region update component 18b. The adaptation agent 20 may also adjust (e.g., optimize) the coding policy associated with the visual content based on the unfiltered feedback information 22 and the display region-specific information 24.

For example, the adaptation agent 20 might apply a first optimization signal 26 to the frame encoder 18c in order to change the encoding bit rate, configure one or more encoding function blocks to change the encoding power, defer one or more encoding operations, refresh reference frame lists, generate I-frame or I-region updates, activate redundancy coding settings, etc. The adaptation agent 20 may also use the first optimization signal 26 to conduct different quantization parameter (QP) selections for different regions of the viewing screen, change the encoding mode for different regions of the viewing screen, and so forth. In another example, the adaptation agent 20 may apply a second optimization signal 25 to the frame capture component 18a in order to defer one or more frame capture operations, etc. Thus, by combining the unfiltered feedback information 22 with the display region-specific information 24, the illustrated computing system 10 may reduce latencies, improve quality, and reduce power consumption.

Figure 2:
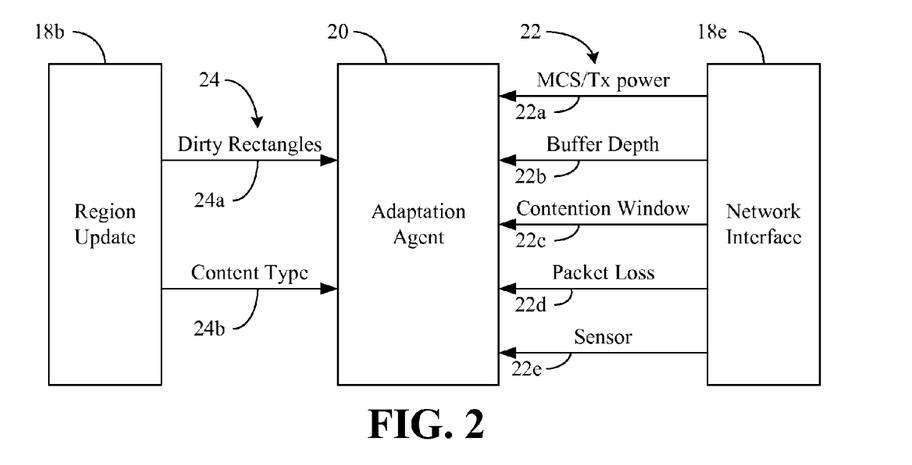
FIG. 2 is a block diagram of an example of the use of unfiltered feedback information and display region-specific information according to an embodiment.

FIG. 2 shows a more detailed example of the unfiltered feedback information 22 (22a-22e) and the display region-specific information 24 (24a, 24b). In the illustrated example, the unfiltered feedback information 22 includes modulation and coding scheme (MCS) information 22a, buffer depth information 22b, contention window status information 22c, packet loss information 22d, sensor information 22e, and so forth. Additionally, the display region-specific information 24 may include "dirty rectangle" information 24a, content type information 24b, and so forth. Thus, the adaptation agent 20 has direct access to a wide variety of unfiltered and instantaneous information when adjusting and/or optimizing the coding policy associated with the wireless display content. The various adaptation techniques that may be used will be discussed in greater detail below.

Figure 3:
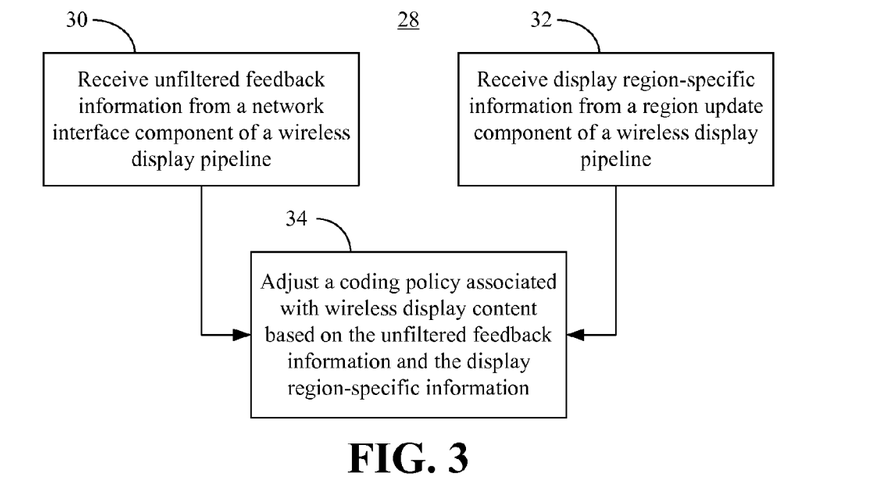
FIG. 3 is a flowchart of an example of a method of adjusting coding policies according to an embodiment.

FIG. 3 shows a method 28 of operating adjusting coding policies. The method 28 may generally be implemented in an adaptation agent such as, for example, the adaptation agent 20 (FIGS. 1 and 2). More particularly, the method 28 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 28 may be written in any combination of one or more programming languages, including an object oriented programming language such as JAVA, SMALLTALK, C++ or the like and conventional procedural programming languages, such as the "C" programming language or similar programming languages.

Illustrated processing block 30 receives unfiltered feedback information from a network interface component of a wireless display pipeline, wherein block 32 may receive display region-specific information from a region update component of the wireless display pipeline. The information may be "pushed" to or "pulled" by the adaptation agent. Additionally, block 34 may adjust a coding policy associated with wireless display content based on the unfiltered feedback information and the display region-specific information.

Figure 4:
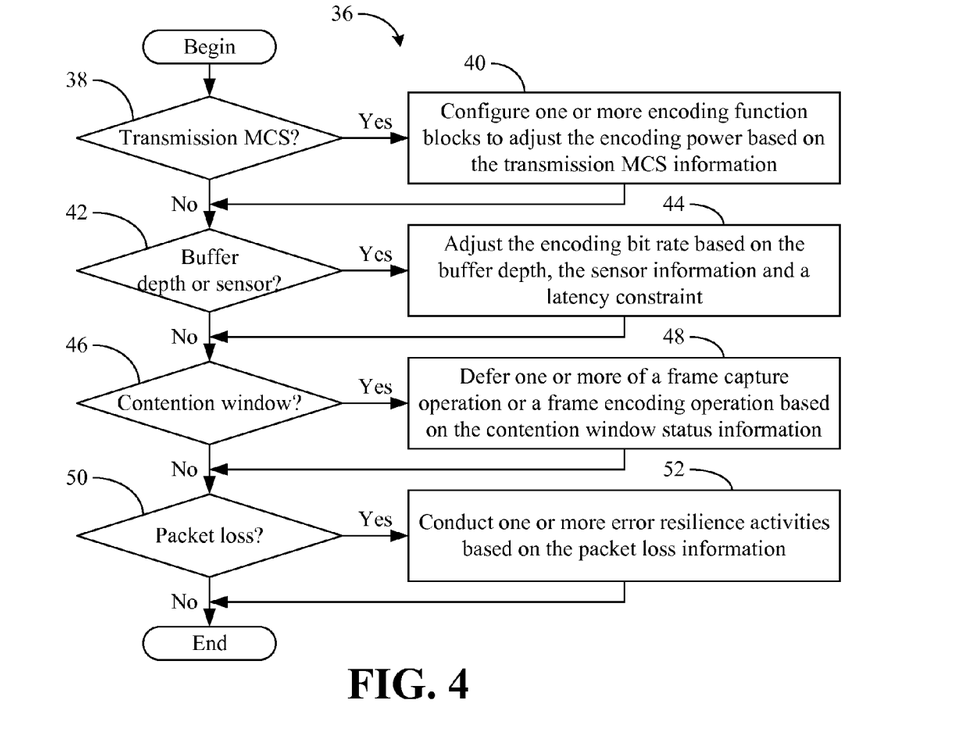
FIG. 4 is a flowchart of an example of a method of adapting a wireless display pipeline based on unfiltered feedback information according to an embodiment.

FIG. 4 shows a method 36 of operating adapting a wireless display pipeline based on unfiltered feedback information. The method 36 may generally be incorporated into the processing block 34 (FIG. 3), already discussed. More particularly, the method 36 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

With continuing reference to FIGS. 2 and 4, illustrated processing block 38 provides for determining whether transmission modulation and coding scheme (MCS) information 22a has been received from the network interface component 18e. The transmission MCS information 22a may generally indicate the currently chosen (e.g., at the physical layer based on link adaptation) MCS level at a transmitter of the network interface component 18e, as well as MCS options one level higher than and one level lower than the currently operative MCS level. If the transmission MCS information 22a is available, block 40 may configure one or more encoding function blocks to adjust the encoding power based on the transmission MCS information 22a. For example, block 40 may incorporate the power sensitivity of the overall transmitted bit rate into the bit rate adaptation by estimating the power tradeoff associated with shortening the active transmission time via a higher MCS level versus the impact of a potentially higher probability of packet loss. More particularly, a higher MCS level may result in a shorter active transmission time but higher packet loss rate vs. a lower MCS may result in a longer transmission time with lower packet loss rate. When a higher MCS index works well, the encoder may turn off some encoding function blocks that tradeoff power for coding efficiency and simply assign more bits for encoding to gain power savings.

Block 40 may also analyze the history of the selected MCS choices in order to predict the likely MCS level for the next transmission, wherein the predicted MCS level may be used to determine the appropriate number of bits to assign to the next frame. For example, when higher bandwidth is available under low transmission power conditions, block 40 might configure one or more encoding function blocks to reduce the encoding energy/power at the expense of more transmission bits in order to save overall power and still meet quality and latency constraints. By contrast, when bandwidth is limited and transmission power is relatively high, block 40 may configure one or more encoding function blocks to increase the encoding energy/power in order to reduce the number of transmitted bits.

Additionally, a determination may be made at block 42 as to whether buffer depth information 22b and/or sensor information 22e is available. The current depth of a transmission buffer such as, for example, the transmission buffer 18d (FIG. 1), may be measured in units of time as, for example, the difference between the tail pointer from where the network interface component 18e is reading and the head pointer to where the encoder is writing. Thus, the buffer depth information 22b may generally indicate the number of frames in the buffer. If the buffer depth information 22b is detected at block 42, block 44 may adjust the encoding bit rate based on the buffer depth information 22b and a latency constraint. For example, block 44 might dynamically adjust the encoding bit rate to ensure that wireless display content arrives at the receiver side within the latency constraint. More particularly, a number of bits may be dynamically assigned to each frame so that the buffer will be timely depleted and latency is minimized. The sensor information 22e may include, for example, location (e.g., global positioning system/GPS) and/or motion (e.g., accelerometer) data. The sensor information 22e may therefore be correlated with the buffer depth information 22b and other unfiltered feedback information 22 to further optimize aspects of the coding policy such as the encoding bit rate.

Illustrated block 46 determines whether contention window status information 22c is available from the network interface component 18e. The contention window status information 22c may indicate how long the network interface component 18e waited before gaining access to the medium for the latest wireless transmission. If the contention window status information 22c is detected at block 46, block 48 may selectively defer frame capture operation(s), frame encoding operation(s), and so forth, based on the contention window status information 22c. In this regard, the contention window status information 22c may be used to infer channel busy status both at the current time as well as under potential future conditions. Accordingly, if block 48 predicts that a delay will be experienced in the next transmission window, frame capture and/or encoding operations may be deferred.

Additionally, block 50 may determine whether packet loss information 22d is available from the network interface component 18e. The packet loss information 22d may be distinct from the application layer end-to-end loss information received from the receiver (e.g., wireless display) side. Rather, when a retry limit (e.g., media access control/MAC retry limit) is exhausted on a packet without receiving an acknowledgement from the receiver MAC, or when a packet transmission delay exceeds a threshold (e.g., time-to-live expires), the packet loss information 22d may indicate such a condition (e.g., mapped to frame loss). If the packet loss information 22d is detected at block 50, illustrated block 52 conducts one or more error resilience activities to avoid future visual corruptions based on the packet loss information 22d. Block 52 may involve, for example, refreshing reference frame lists to prevent error propagation caused by a lost reference, generating I-frame or I-region updates to repair the error, activating redundancy coding settings to protect the content if the network condition does not improve, etc. Other adjustments to the coding policy may also be conducted based on the unfiltered feedback information 22.

Figure 5:
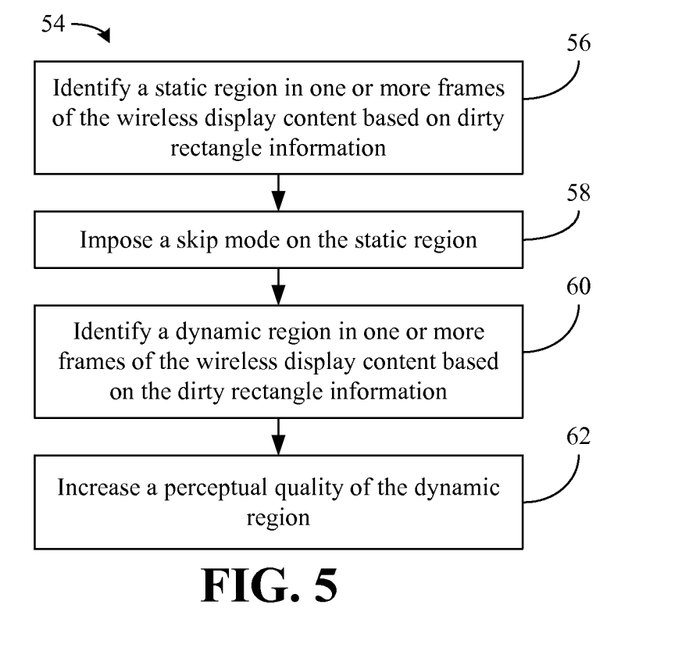
FIG. 5 is a flowchart of an example of a method of adapting a wireless display pipeline based on display region-specific information according to an embodiment.

FIG. 5 shows a method 54 of adapting a wireless display pipeline based on display region-specific information. The method 54 may generally be incorporated into the processing block 34 (FIG. 3), already discussed. More particularly, the method 54 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

With continuing reference to FIGS. 2 and 5, illustrated processing block 56 provides for identifying a static region in one or more frames of the wireless display content based on the dirty rectangle information 24a. The dirty rectangle information 24a may generally specify the region of the wireless display being updated. Thus, block 58 may impose a skip mode on the static region in order to expedite coding speed and save coding power. The skip mode may record that one or more macroblocks in the static region are skip macroblocks, wherein the decoder on the receiver side may deduce the motion vector of the skip mode coded macroblock from other macroblocks already decoded. Illustrated block 60 identifies a dynamic region of one or more frames of the wireless display content based on the dirty rectangle information 24a, wherein the perceptual quality of the dynamic region may be increased at block 62. Block 62 may include, for example, reducing the quantization parameter (QP) value of the dynamic region.

Additionally, the content type information 24b (e.g., productivity vs. entertainment media) may be used to adapt rate control mechanisms in the encoder so that coding efficiency and perceptual quality may be improved. For productivity content, the quality may be quickly boosted by assigning a large chunk of bits to the first few frames and using the minimum amount of bits (e.g., zero) for the following static frames while maintaining excellent quality. For media content, block 62 may choose coding modes and QP values based on the temporal characteristics of the video to optimize the coding efficiency with the goal of smoothness and a constant frame rate.

Furthermore, block 62 may involve combining the dirty rectangle information 24a with the content type information 24b in order to determine how to distribute bits and power across the static/dynamic regions. For example, with two region updates (e.g., productivity and media) in a frame, block 62 might apply different motion search/compensation schemes for different region types. Such an approach may enable optimization of power usage and adaptive assignment of bits while satisfying quality requirements for different regions.

Figure 6:
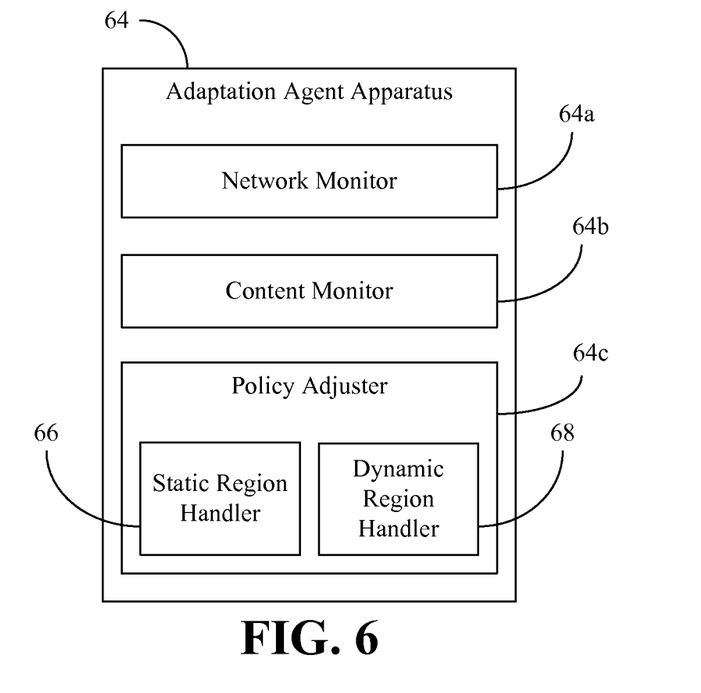
FIG. 6 is a block diagram of an example of an adaptation agent apparatus according to an embodiment.

Turning now to FIG. 6 an adaptation agent apparatus 64 (64a-64c) is shown. The adaptation agent apparatus 64 may be readily substituted for the adaptation agent 20 (FIGS. 1 and 2), already discussed. Additionally, the adaptation agent apparatus 64 may implement one or more aspects of the method 28 (FIG. 3), the method 36 (FIG. 4) and/or the method 54 (FIG. 5), already discussed. In the illustrated example, a network monitor 64a receives unfiltered feedback information from a network interface component of a wireless display pipeline and a content monitor 64b receives display region-specific information from a region update component of the wireless display pipeline. The adaptation agent apparatus 64 may also include a policy adjuster 64c to adjust a coding policy associated with wireless display content based on the unfiltered feedback information and the display region-specific information.

As already noted, the unfiltered feedback information may include transmission MCS information. In such a case, the policy adjuster 64c may configure one or more encoding function blocks to adjust encoding power based on the transmission MCS information. Additionally, the unfiltered feedback information may include transmission buffer depth information, wherein the policy adjuster 64c may adjust the encoding bit rate based on the transmission buffer depth information and a latency constraint. Moreover, the unfiltered feedback information may include contention window status information. Thus, the policy adjuster 64c may defer one or more of a frame capture operation or a frame encoding operating based on the contention window status information. In addition, the unfiltered feedback information may include packet loss information, wherein the policy adjuster 64c may conduct one or more error resilience activities based on the packet loss information.

In one example, the policy adjuster 64c includes a static region handler 66 to identify a static region in one or more frames of the wireless display content based on dirty rectangle information in the display region-specific information. The static region handler 66 may also impose a skip mode on the static region. Additionally, a dynamic region handler 68 may identify a dynamic region in one or more frames of the wireless display content based on the dirty rectangle information and increase the perceptual quality of the dynamic region.

Additional Notes and Examples

Example 1 may include a content delivery computing system comprising a content source to provide wireless display content, a wireless display pipeline including a network interface component, an encoder having a coding policy associated with the wireless display content, and a region update component, and an adaptation agent including a network monitor to receive unfiltered feedback information from the network interface component, a content monitor to receive display region-specific information from the region update component, and a policy adjuster to adjust the coding policy based on the unfiltered feedback information and the display region-specific information.

Example 2 may include the system of Example 1, wherein the unfiltered feedback information is to include transmission modulation and coding scheme (MCS) information and the policy adjuster is to configure one or more encoding function blocks to adjust an encoding power based on the transmission MCS information.

Example 3 may include the system of Example 1, wherein the unfiltered feedback information is to include transmission buffer depth information and the policy adjuster is to adjust an encoding bit rate based on the transmission buffer depth information and a latency constraint.

Example 4 may include the system of Example 1, wherein the unfiltered feedback information is to include contention window status information and the policy adjuster is to defer one or more of a frame capture operation or a frame encoding operation based on the contention window status information.

Example 5 may include the system of Example 1, wherein the unfiltered feedback information is to include packet loss information and the policy adjuster is to conduct one or more error resilience activities based on the packet loss information.

Example 6 may include the system of any one of Examples 1 to 5, wherein the display region-specific information is to include dirty rectangle information and the policy adjuster includes a static region handler to identify a static region in one or more frames of the wireless display content based on the dirty rectangle information and impose a skip mode on the static region, and a dynamic region handler to identify a dynamic region in one or more frames of the wireless display content based on the dirty rectangle information and increase a perceptual quality of the dynamic region.

Example 7 may include an adaptation agent apparatus comprising a network monitor to receive unfiltered feedback information from a network interface component of a wireless display pipeline, a content monitor to receive display region-specific information from a region update component of the wireless display pipeline, and a policy adjuster to adjust a coding policy associated with wireless display content based on the unfiltered feedback information and the display region-specific information.

Example 8 may include the apparatus of Example 7, wherein the unfiltered feedback information is to include transmission modulation and coding scheme (MCS) information and the policy adjuster is to configure one or more encoding function blocks to adjust an encoding power based on the transmission MCS information.

Example 9 may include the apparatus of Example 7, wherein the unfiltered feedback information is to include transmission buffer depth information and the policy adjuster is to adjust an encoding bit rate based on the transmission buffer depth information and a latency constraint.

Example 10 may include the apparatus of Example 7, wherein the unfiltered feedback information is to include contention window status information and the policy adjuster is to defer one or more of a frame capture operation or a frame encoding operation based on the contention window status information.

Example 11 may include the apparatus of Example 7, wherein the unfiltered feedback information is to include packet loss information and the policy adjuster is to conduct one or more error resilience activities based on the packet loss information.

Example 12 may include the apparatus of any one of Examples 7 to 11, wherein the display region-specific information is to include dirty rectangle information and the policy adjuster includes a static region handler to identify a static region in one or more frames of the wireless display content based on the dirty rectangle information and impose a skip mode on the static region, and a dynamic region handler to identify a dynamic region in one or more frames of the wireless display content based on the dirty rectangle information and increase a perceptual quality of the dynamic region.

Example 13 may include a method of operating an adaptation agent apparatus comprising receiving unfiltered feedback information from a network interface component of a wireless display pipeline, receiving display region-specific information from a region update component of the wireless display pipeline, and adjusting a coding policy associated with wireless display content based on the unfiltered feedback information and the display region-specific information.

Example 14 may include the method of Example 13, wherein the unfiltered feedback information includes transmission modulation and coding scheme (MCS) information and adjusting the coding policy includes configuring one or more encoding function blocks to adjust an encoding power based on the transmission MCS information.

Example 15 may include the method of Example 13, wherein the unfiltered feedback information includes transmission buffer depth information and adjusting the coding policy includes adjusting an encoding bit rate based on the transmission buffer depth information and a latency constraint.

Example 16 may include the method of Example 13, wherein the unfiltered feedback information includes contention window status information and adjusting the coding policy includes deferring one or more of a frame capture operation or a frame encoding operation based on the contention window status information.

Example 17 may include the method of Example 13, wherein the unfiltered feedback information includes packet loss information and adjusting the coding policy includes conducting one or more error resilience activities based on the packet loss information.

Example 18 may include the method of any one of Examples 13 to 17, wherein the display region-specific information includes dirty rectangle information and adjusting the coding policy includes identifying a static region in one or more frames of the wireless display content based on the dirty rectangle information, imposing a skip mode on the static region, identifying a dynamic region in one or more frames of the wireless display content based on the dirty rectangle information, and increasing a perceptual quality of the dynamic region.

Example 19 may include at least one non-transitory computer readable storage medium comprising a set of instructions, which when executed by a computing device, cause the computing device to receive unfiltered feedback information from a network interface component of a wireless display pipeline, receive display region-specific information from a region update component of the wireless display pipeline, and adjust a coding policy associated with wireless display content based on the unfiltered feedback information and the display region-specific information.

Example 20 may include the at least one non-transitory computer readable storage medium of Example 19, wherein the unfiltered feedback information is to include transmission modulation and coding scheme (MCS) information and the instructions, when executed, cause a computing device to configure one or more encoding function blocks to adjust an encoding power based on the transmission MCS information.

Example 21 may include the at least one non-transitory computer readable storage medium of Example 19, wherein the unfiltered feedback information is to include transmission buffer depth information and the instructions, when executed, cause a computing device to adjust an encoding bit rate based on the transmission buffer depth information and a latency constraint.

Example 22 may include the at least one non-transitory computer readable storage medium of Example 19, wherein the unfiltered feedback information is to include contention window status information and the instructions, when executed, cause a computing device to defer one or more of a frame capture operation or a frame encoding operation based on the contention window status information.

Example 23 may include the at least one non-transitory computer readable storage medium of Example 19, wherein the unfiltered feedback information is to include packet loss information and the instructions, when executed, cause a computing device to conduct one or more error resilience activities based on the packet loss information.

Example 24 may include the at least one non-transitory computer readable storage medium of any one of Examples 19 to 23, wherein the display region-specific information includes dirty rectangle information and the instructions, when executed, cause a computing device to identify a static region in one or more frames of the wireless display content based on the dirty rectangle information, impose a skip mode on the static region, identify a dynamic region in one or more frames of the wireless display content based on the dirty rectangle information, and increase a perceptual quality of the dynamic region.

Example 25 may include an adaptation agent apparatus comprising means for receiving unfiltered feedback information from a network interface component of a wireless display pipeline, means for receiving display region-specific information from a region update component of the wireless display pipeline, and means for adjusting a coding policy associated with wireless display content based on the unfiltered feedback information and the display region-specific information.

Example 26 may include the apparatus of Example 25, wherein the unfiltered feedback information is to include transmission modulation and coding scheme (MCS) information and the means for adjusting the coding policy includes means for adjusting an encoding power based on the transmission MCS information.

Example 27 may include the apparatus of Example 25, wherein the unfiltered feedback information is to include transmission buffer depth information and the means for adjusting the coding policy includes means for adjusting an encoding bit rate based on the transmission buffer depth information and a latency constraint.

Example 28 may include the apparatus of Example 25, wherein the unfiltered feedback information is to include contention window status information and the means for adjusting the coding policy includes means for deferring one or more of a frame capture operation or a frame encoding operation based on the contention window status information.

Example 29 may include the apparatus of Example 25, wherein the unfiltered feedback information is to include packet loss information and the means for adjusting the coding policy includes means for conducting one or more error resilience activities based on the packet loss information.

Example 30 may include the apparatus of any one of Examples 25 to 29, wherein the display region-specific information is to include dirty rectangle information and the means for adjusting the coding policy includes means for identifying a static region in one or more frames of the wireless display content based on the dirty rectangle information, means for imposing a skip mode on the static region, means for identifying a dynamic region in one or more frames of the wireless display content based on the dirty rectangle information, and means for increasing a perceptual quality of the dynamic region.

Techniques described herein may therefore provide interactive feedback information to a wireless display adaptation agent on an "immediate" basis (e.g., rather than on a filtered and/or statistical basis). The wireless display adaptation agent may exploit the feedback immediately as well as in the longer term (e.g., analyzing the data for patterns that can help optimize the wireless display pipeline).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising: a content source to provide wireless display content; a wireless display pipeline including: a network interface component; an encoder having a coding policy associated with the wireless display content; and a region update component; and an adaptation agent including: a network monitor to receive unfiltered feedback information from the network interface component; a content monitor to receive display region-specific information from the region update component; and a policy adjuster to adjust the coding policy based on the unfiltered feedback information and the display region-specific information; wherein the display region-specific information is to include dirty rectangle information and the policy adjuster includes: a static region handler to identify a static region in one or more frames of the wireless display content based on the dirty rectangle information and impose a skip mode on the static region; and a dynamic region handler to identify a dynamic region in one or more frames of the wireless display content based on the dirty rectangle information and adapt a rate control mechanism based upon content type information to increase wireless display content quality of the dynamic region from a user perspective.

2. The system of claim 1, wherein the unfiltered feedback information is to include transmission modulation and coding scheme (MCS) information and the policy adjuster is to configure one or more encoding function blocks to adjust an encoding power based on the transmission MCS information.

3. The system of claim 1, wherein the unfiltered feedback information is to include transmission buffer depth information and the policy adjuster is to adjust an encoding bit rate based on the transmission buffer depth information and a latency constraint.

4. The system of claim 1, wherein the unfiltered feedback information is to include contention window status information and the policy adjuster is to defer one or more of a frame capture operation or a frame encoding operation based on the contention window status information.

5. The system of claim 1, wherein the unfiltered feedback information is to include packet loss information and the policy adjuster is to conduct one or more error resilience activities based on the packet loss information.

6. An apparatus comprising:
a network monitor to receive unfiltered feedback information from a network interface component of a wireless display pipeline;
a content monitor to receive display region-specific information from a region update component of the wireless display pipeline; and
a policy adjuster to adjust a coding policy associated with wireless display content based on the unfiltered feedback information and the display region-specific information;
wherein the display region-specific information is to include dirty rectangle information and the policy adjuster includes: a static region handler to identify a static region in one or more frames of the wireless display content based on the dirty rectangle information and impose a skip mode on the static region; and a dynamic region handler to identify a dynamic region in one or more frames of the wireless display content based on the dirty rectangle information and adapt a rate control mechanism based upon content type information to increase wireless display content quality of the dynamic region from a user perspective.

7. The apparatus of claim 6, wherein the unfiltered feedback information is to include transmission modulation and coding scheme (MCS) information and the policy adjuster is to configure one or more encoding function blocks to adjust an encoding power based on the transmission MCS information.

8. The apparatus of claim 6, wherein the unfiltered feedback information is to include transmission buffer depth information and the policy adjuster is to adjust an encoding bit rate based on the transmission buffer depth information and a latency constraint.

9. The apparatus of claim 6, wherein the unfiltered feedback information is to include contention window status information and the policy adjuster is to defer one or more of a frame capture operation or a frame encoding operation based on the contention window status information.

10. The apparatus of claim 6, wherein the unfiltered feedback information is to include packet loss information and the policy adjuster is to conduct one or more error resilience activities based on the packet loss information.

11. A method comprising: receiving unfiltered feedback information from a network interface component of a wireless display pipeline;
receiving display region-specific information from a region update component of the wireless display pipeline; and
adjusting a coding policy associated with wireless display content based on the unfiltered feedback information and the display region-specific information;
wherein the display region-specific information includes dirty rectangle information and adjusting the coding policy includes:
identifying a static region in one or more frames of the wireless display content based on the dirty rectangle information;
imposing a skip mode on the static region; identifying a dynamic region in one or more frames of the wireless display content based on the dirty rectangle information; and adapting a rate control mechanism based upon content type information to increase wireless display content quality of the dynamic region from a user perspective.

12. The method of claim 11, wherein the unfiltered feedback information includes transmission modulation and coding scheme (MCS) information and adjusting the coding policy includes configuring one or more encoding to adjust an encoding power based on the transmission MCS information.

13. The method of claim 11, wherein the unfiltered feedback information includes transmission buffer depth information and adjusting the coding policy includes adjusting an encoding bit rate based on the transmission buffer depth information and a latency constraint.

14. The method of claim 11, wherein the unfiltered feedback information includes contention window status information and adjusting the coding policy includes deferring one or more of a frame capture operation or a frame encoding operation based on the contention window status information.

15. The method of claim 11, wherein the unfiltered feedback information includes packet loss information and adjusting the coding policy includes conducting one or more error resilience activities based on the packet loss information.

16. At least one non-transitory computer readable storage medium comprising a set of instructions, which when executed by a computing device, cause the computing device to:
receive unfiltered feedback information from a network interface component of a wireless display pipeline;
receive display region-specific information from a region update component of the wireless display pipeline; and adjust a coding policy associated with wireless display content based on the unfiltered feedback information and the display region-specific information;
wherein the display region-specific information includes dirty rectangle information and the instructions, when executed, cause a computing device to:
identify a static region in one or more frames of the wireless display content based on the dirty rectangle information; impose a skip mode on the static region; identify a dynamic region in one or more frames of the wireless display content based on the dirty rectangle information; and adapt a rate control mechanism based upon content type information to increase wireless display content quality of the dynamic region from a user perspective.

17. The at least one non-transitory computer readable storage medium of claim 16, wherein the unfiltered feedback information is to include transmission modulation and coding scheme (MCS) information and the instructions, when executed, cause a computing device to configure one or more encoding function blocks to adjust an encoding power based on the transmission MCS information.

18. The at least one non-transitory computer readable storage medium of claim 16, wherein the unfiltered feedback information is to include transmission buffer depth information and the instructions, when executed, cause a computing device to adjust an encoding bit rate based on the transmission buffer depth information and a latency constraint.

19. The at least one non-transitory computer readable storage medium of claim 16, wherein the unfiltered feedback information is to include contention window status information and the instructions, when executed, cause a computing device to defer one or more of a frame capture operation or a frame encoding operation based on the contention window status information.

20. The at least one non-transitory computer readable storage medium of claim 16, wherein the unfiltered feedback information is to include packet loss information and the instructions, when executed, cause a computing device to conduct one or more error resilience activities based on the packet loss information.

* * * * *